W. E. PEARSON.
FLUID POWER TRANSMISSION AND CONTROLLING APPARATUS.
APPLICATION FILED AUG. 31, 1909.

972,223.

Patented Oct. 11, 1910.
3 SHEETS—SHEET 2.

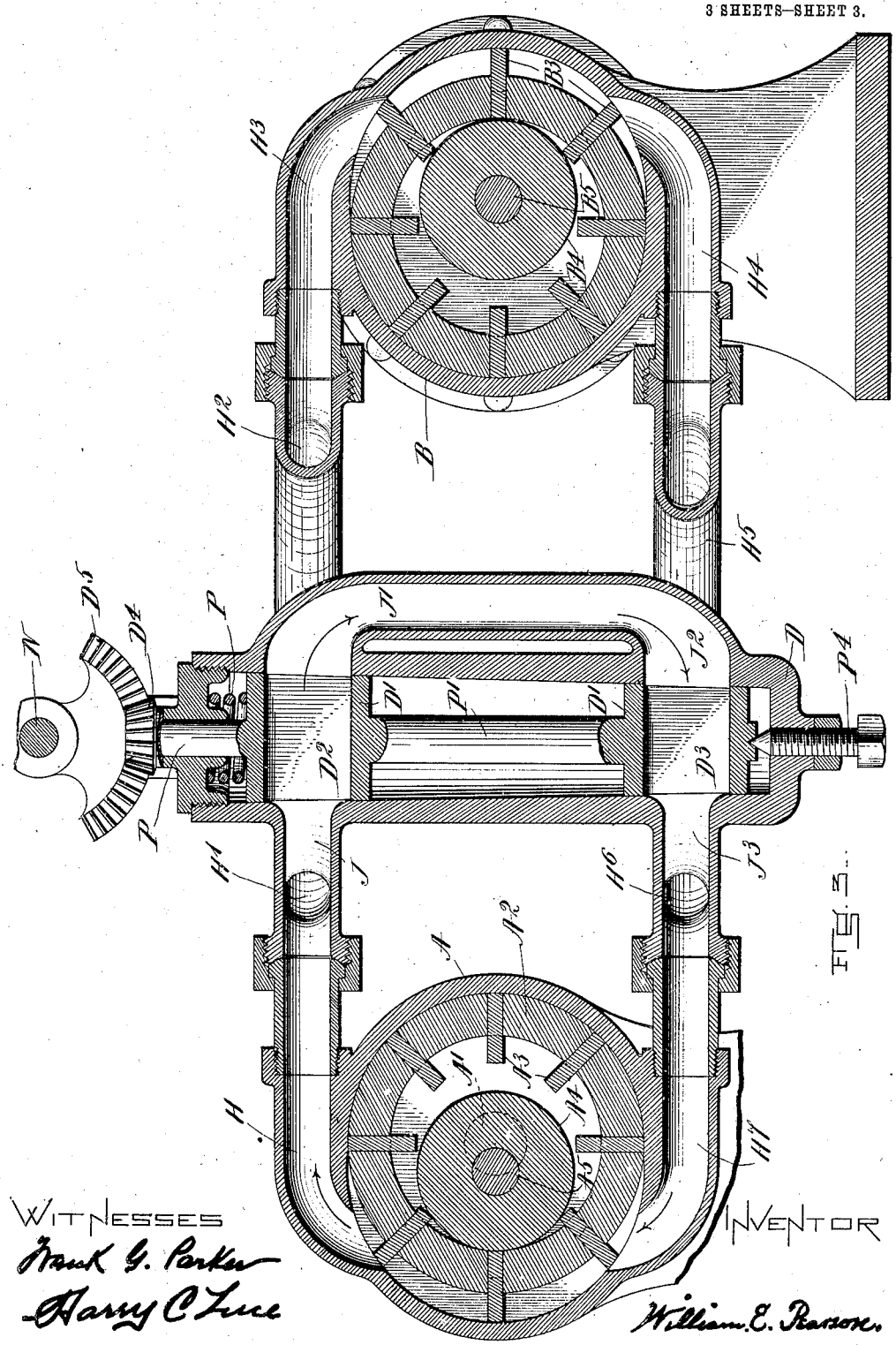

UNITED STATES PATENT OFFICE.

WILLIAM E. PEARSON, OF BOSTON, MASSACHUSETTS.

FLUID POWER TRANSMISSION AND CONTROLLING APPARATUS.

972,223.     Specification of Letters Patent.     Patented Oct. 11, 1910.

Application filed August 31, 1909. Serial No. 515,531.

*To all whom it may concern:*

Be it known that I, WILLIAM E. PEARSON, a citizen of the United States, resident of Boston, in the county of Suffolk and State of Massachusetts, have invented a new and useful Improvement in Fluid Power Transmission and Controlling Apparatus, of which the following, taken in connection with the accompanying drawings, is a specification.

My invention relates to an apparatus for transmitting and controlling power and consists in a peculiarly constructed mechanism which has for its object the complete control and transmission of power by the aid of any suitable fluid.

The exact construction and operation of this apparatus may be best understood by reference to the description, specification and to the accompanying drawings in which—

Figure 1:
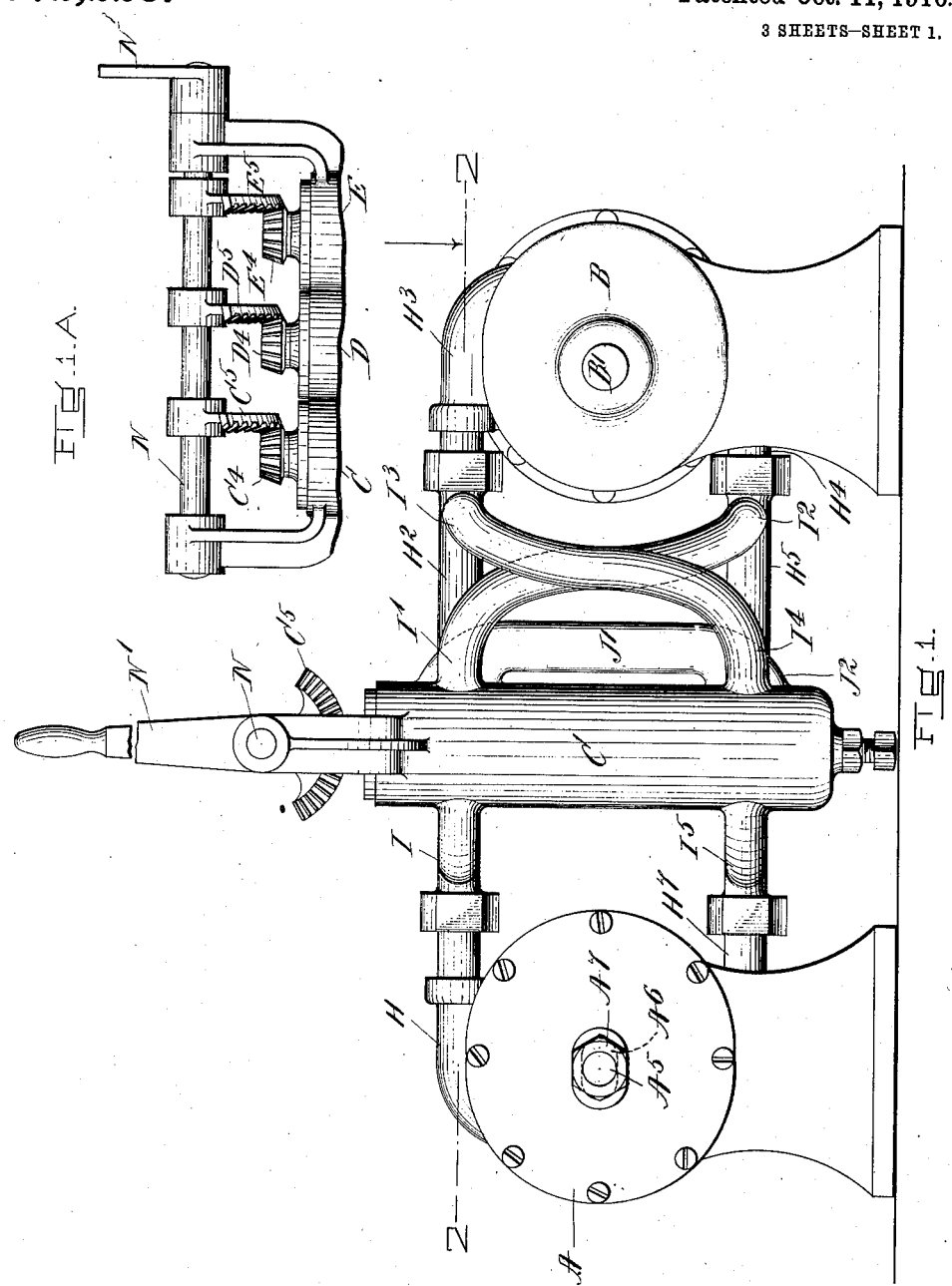
Figure 2:
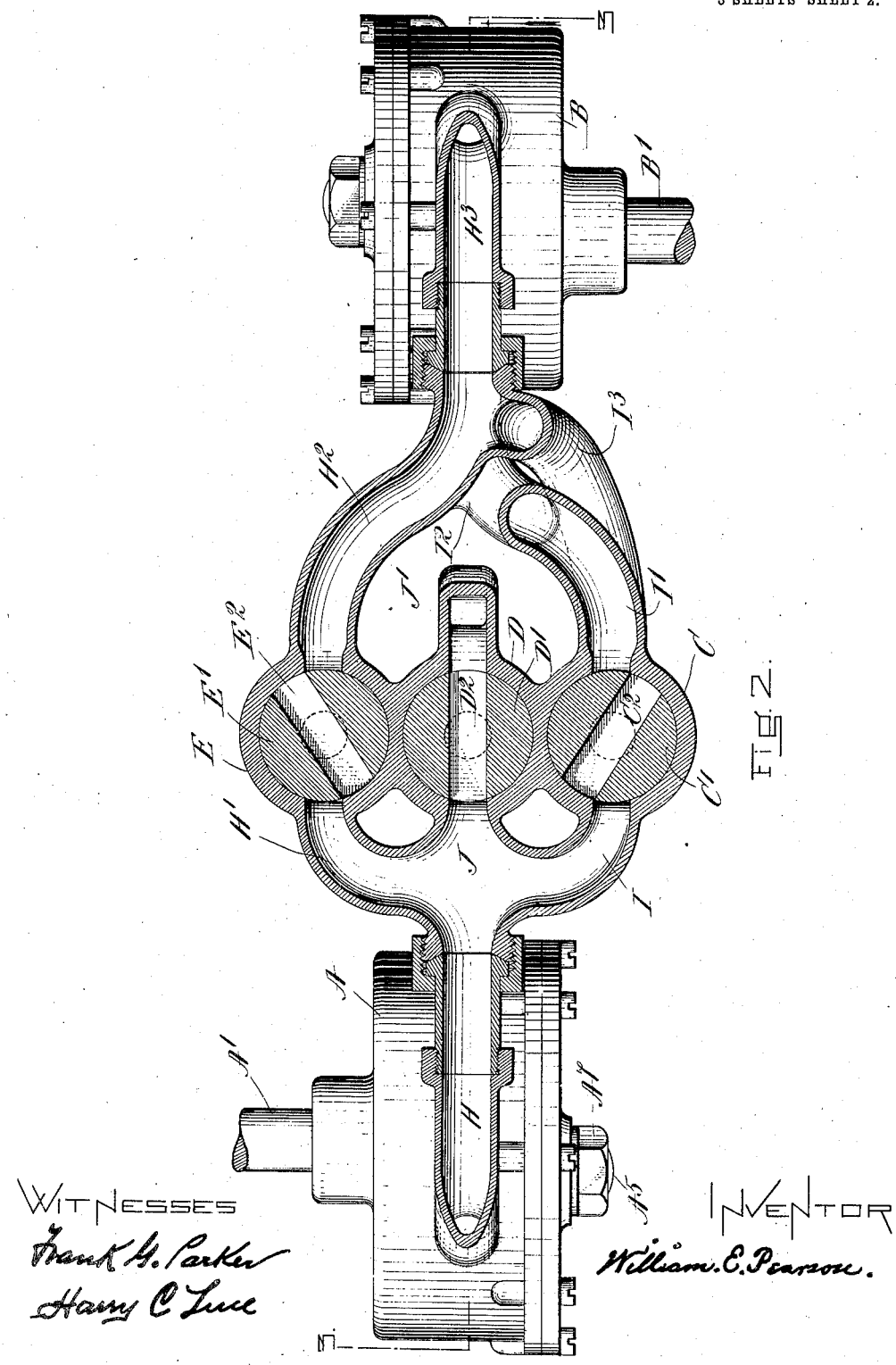

Figure 1 is a side elevation of my apparatus; Fig. 1$^A$ is a view in elevation showing a device for simultaneously operating the controlling valves; Fig. 2 is a view showing a horizontal section taken on line 2—2 of Fig. 1, showing other parts in plan; Fig. 3 is a vertical section taken on line 3—3 of Fig. 2.

In the drawings I have shown a fluid driving rotary pump A and a fluid driven motor B. I do not wish to confine myself to this particular kind of pump and motor as others may be used instead. It will be observed, from the drawings, that both the driving and driven devices above referred to deliver and receive tangentially.

In Fig. 3 the pump A and motor B are shown in section. The pump A has a casing as shown and a shaft $A'$, upon which the piston carrier $A^2$ is mounted. This piston carrier has pistons $A^3$ which slide radially and are governed in their movements by the piston controller $A^4$; the said piston controller $A^4$ is fixed and adjustably held in place by the stud $A^5$; the said stud $A^5$ passes through an elongated hole $A^6$ in the casing of the pump A and is adjustably held in place by the clamping nut $A^7$. The driven motor B has the same construction as the pump A, that is, it has carrying inlet and outlet ports, a piston carrier $B^2$ mounted upon a shaft $B'$, pistons $B^3$ $B^3$ and a controller $B^4$ mounted upon a stud $B^5$ adjustably held in the same manner that the stud $A^5$ is held.

I will now describe the device by which the power delivered from the pump A is transmitted to the motor B, controlled as to amount and direction of movement.

Referring to Fig. 2, C, D and E represent the casings of corresponding plug-valves $C'$, $D'$ and $E'$. As these plug-valves are made exactly alike, I will describe but one of them. The control valve $D'$ consists of a central shaft P, $P'$, see Fig. 3; attached to this central shaft are two valve-way plugs $D'$, $D'$, through the center of each are ways or passages $D^2$ $D^3$ connecting with the several circulating ducts as will be hereinafter explained.

To provide for wear and to maintain permanently tight joints, I have the following-described construction: The cylindrical opening in the plug case D is slightly coned as shown so that the way-plugs $D^2$ and $D^3$ on the shaft P, $P'$, as they wear may be made to fit tight by simply forcing them downward to admit of this, a spiral spring $P^3$ is placed at the top and an adjusting screw $P^4$ at the bottom, so that as the plugs $D'$, $D'$ wear the adjusting screw $P^4$ may be turned outward and thus allow the spring $P^3$ to force the plugs downward into a smaller part of the coned interior of the valve casing.

The three plug-valves are operated simultaneously by means of the hand lever $N'$, Fig. 1$^A$, which operates the rocker-shaft N; this rocker-shaft N has upon it three segment gears $E^5$, $D^5$, $C^5$ which engage with corresponding bevel gears $E^4$, $D^4$ and $C^4$ which are severally connected with the said valve-plugs.

The operation of my apparatus is as follows: Suppose the pump A sends the fluid in the direction indicated by the arrow, Fig. 3, through the pipes H and J to and through the way $D^2$ in the plug valve $D'$, thence to the pipe $J'$, $J^2$ to the way $D^3$ in the lower part of the plug-valve $D'$, thence through the pipes $J^3$ and $H^7$ back to the pump A. In this arrangement, the valves $C'$, $D'$, $E'$ will be as shown in Fig. 2, and the current of fluid from the pump will pass back to the pump not going to the motor B at all and, of course, doing no work. Now, in case we wish the motor B to rotate in the same direction that the pump A rotates, we turn the plug valves, by using the hand lever $N'$, so that there will be a passage through the upper way $E^2$ and also through the lower way in the same plug but not shown; now, the current from the pump will pass through pipes H and H', Fig. 2 and valve-way $E^2$ in the plug E now open (the valve-ways in plugs D' and C' being closed), thence the fluid will pass through the pipes $H^2$ and $H^3$ to the motor B, thence back, see Fig. 3, through pipes $H^4$ $H^5$ to the lower passage or way (not shown) in the plug valve E, thence through passages $H^6$, $H^7$, Fig. 3, back to pump A. To cause the motor B to rotate in a direction the reverse of that of the pump A, we turn the valves so way-plug C', Fig. 2, shall open in such a manner as to allow the fluid to pass through the pipe I, valve-way $C^2$, (now open) pipe I', $I^2$, see Figs. 1 and 2, to the pipe $H^4$, Fig. 1, to the under side of the motor B, thence up through the motor to the pipe $H^3$, thence through the pipe $I^3$, $I^4$ to the lower way in the plug C' to the pipes $I^5$, Fig. 1, to the pipe $H^7$ and the pump, Fig. 3.

As the plug valves C', D', E' are geared together and operated by a single lever N' it is evident that the said plugs must all turn in unison. And they are so arranged as to "ways" in each that when one set of "ways" are wide open, see $D^2$ $D^3$ of the plug D', Fig. 3, the sets of ways in the plugs C' and E' are closed, and there is no time when the ways are all closed or all open, and further when one set of ways in one plug are closing then a set of one of the other two plugs are being opened and as soon as the closing set of ways is fully closed, then the opening set of the other plug is fully open.

It is to be understood that by the construction and arrangement of the valve plugs D' E' and C' and their respective water or fluid ways, no two of the valve plugs can be wholly closed at the same time, that one of them can be wholly closed and only one, that the central plug D' may be partly closed and at the same time one of the side plugs C' or E' may be partly open or partly closed. For instance, when no power is being transmitted to the engine, the central plug D is wide open, see Fig. 2, and the transmission fluid will pass from the pump A through the upper way $D^2$ in the plug valve D, thence down through the passage J', $J^2$ see Fig. 3, to the lower way $D^3$ and back to the pump A.

If it is desired to drive the motor direct in the same way that the pump works, the plug valves D', E' and C', all operating together and in the same direction, are turned, see Fig. 2, so that the way $D^2$ will begin to close and the way $E^2$ will begin to open, so that there will be no strain on the pump as the free flow of transmitting fluid will not be checked, since, as the ways or ports in the plug valve D' are being gradually closed, the ways of the plug valve E' are being opened and when one is entirely closed, the other will be wholly opened. Thus we see that the apparatus can be started up with the motor at rest and gradually made to operate at first with but the slightest power transmitted and the said power be gradually augmented until the full force is transmitted to the motor. Now, to stop the motor the valve plugs are turned in the other direction gradually closing the ways in the valve plug E' and opening those in the plug D'. This motion continued will close the ways in E' and open them wide in D, and a further continuance will gradually close the ways in the valve plug D' and open the ways in the valve plug C' which action will cause the motor to rotate in reverse. We observe from the above that under no positions of the valve plugs will there be any prevention of the full and clear flow of the water or other fluid of transmission, and that the operator has full control of the amount of power transmitted and its direction.

Claim:

In an apparatus of this description, a pump constructed to propel any suitable transmitting fluid, three coned plug valves, each provided with two way-passages, means for conducting the said transmitting fluid to the said plug valves, a motor and means for transmitting the said transmission fluid from the ways of the said plug valves to and from the said motor, a passage way connecting one way of one of the plug valves to the other way of the same plug valve, whereby no restraint of flow of the transmission fluid can take place in the operation of the apparatus; substantially as and for the purpose set forth.

In testimony whereof, I have signed my name to this specification in the presence of two subscribing witnesses, on this 30th day of August A. D. 1909.

WILLIAM E. PEARSON.

Witnesses:
WILLIAM EDSON,
FRANK G. PARKER.